(12) United States Patent
Gabe et al.

(10) Patent No.: US 6,802,180 B2
(45) Date of Patent: Oct. 12, 2004

(54) EXHAUST GAS PURIFICATION SYSTEM AND METHOD FOR CONTROLLING REGENERATION THEREOF

(75) Inventors: Masashi Gabe, Fujisawa (JP); Takehito Imai, Fujisawa (JP); Naofumi Ochi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/305,121

(22) Filed: Nov. 27, 2002

(65) Prior Publication Data

US 2003/0106308 A1 Jun. 12, 2003

(30) Foreign Application Priority Data

Nov. 28, 2001 (JP) ........................................ 2001-362828

(51) Int. Cl.[7] ................................................ F01N 3/00
(52) U.S. Cl. ........................... 60/285; 60/274; 60/295; 60/311
(58) Field of Search .......................... 60/274, 285, 295, 60/297, 311

(56) References Cited

U.S. PATENT DOCUMENTS 6,167,696 B1 * 1/2001 Maaseidvaag et al. ........ 60/274
6,304,815 B1 * 10/2001 Moraal et al. .............. 701/115
6,422,001 B1 * 7/2002 Sherman et al. ............. 60/274
6,438,948 B2 * 8/2002 Ono et al. ..................... 60/311

* cited by examiner

Primary Examiner—Thomas Denion
Assistant Examiner—Diem Tran
(74) Attorney, Agent, or Firm—Staas & Halsey LLP

(57) ABSTRACT

An exhaust gas purification system includes the DPF to purify particulate matters in the exhaust gas of a diesel engine, comprising a regeneration control device to judge a condition of an engine operation to be an idle operation or not at the time of starting the control operation for regenerating the diesel particulate filter and during the regeneration control operation, when the engine operation is judged to be an idle operation, an idle engine speed is controlled and raised to the predetermined engine speed.

Since the system includes such structure, in an operation of the DPF regenerate control, an adequate exhaust gas flow rate can be kept even in an idle operation and a raise of the DPF temperature due to a reduction of the exhaust gas flow rate can be avoided so as to prevent a damage of the DPF from melting and a deterioration of the catalyst.

4 Claims, 8 Drawing Sheets

EXHAUST GAS PURIFICATION SYSTEM AND METHOD FOR CONTROLLING REGENERATION THEREOF

BACKGROUND OF THE INVENTION

1. Field of the Invention

The present invention relates to an exhaust gas purification system and a method for controlling a regeneration thereof using a filter which is called a diesel particulate filters (DPF: Diesel Particulate Filter: called a DPF hereinbelow) to collect particulate matters: (PM: particulate matters: called a PM hereinbelow) in an exhaust gas of a diesel engine.

2. Related Art

The exhaust volume control of the PM exhausted from a diesel engine, together with that of Nox, CO, HC, and the like, has been strengthened with the years and a technique for collecting the PM by the DPF in order to reduce the PM volume to be exhausted out has been developed.

For the DPF to directly collect the PM, there are a monolith honeycomb-shaped wall flow type filter made of ceramics, a fiber-shaped type filter having a fiber made of ceramics or metals. An exhaust gas purification device using these DPF is disposed on the way of an exhaust pipe of the engine to purify the exhaust gas generated in the engine.

In such DPF, however, a filter is clogging up during collecting the PM to cause a raise of an exhaust gas pressure (exhaust pressure), so that some methods and systems have been developed for the necessity of removing the PM from the DPF.

Among the methods and systems aforementioned, there are systems to burn and remove the PM by heating the filter by an electric heater or a burner and to reverse-clean the PM by ventilating air in the reverse direction. However, since the PM is burned by a heating energy supplied from exterior, in such systems there are problems to cause a deterioration of fuel efficiency and a difficulty of controlling the regeneration.

Furthermore if these systems are applied, two systems of exhaust passages equipped with a filter are acquired and there are many cases to repeat the collection of the PM and the regeneration of the filter alternately, so that the system tends to becomes large and be expensive.

To overcome these problems, as illustrated in FIG. 3 and FIG. 4, a continuous regeneration type DPF system is proposed to combine a catalyst with a wall flow type filter in order to reduce the regeneration temperature of the DPF and to regenerate the DPF by using an exhaust heat from the engine.

The wall flow type filter 10 includes a plurality of exhaust gas passages (cells) 11a, 11b of which a periphery is formed with a porous wall surface 12, and an inlet side 15 and an outlet side 16 of the exhaust gas passages 11a, 11b are respectively formed to seal in a staggered way 13.

In a continuous regeneration type DPF system, the regeneration of the DPF and the collection of the PM are practiced continuously to become a further compact single system, so that the control of the regeneration may be also simple.

In FIG. 5, a continuous regeneration type DPF system ($NO_2$ regeneration type DPF system) 1A by nitrogen dioxide comprises an oxidation catalyst 3Aa in the upper flow side and a wall flow type filter 3Ab in the lower flow side. Nitrogen monoxide in the exhaust gas is oxidized by an oxidation catalyst 3Aa such as platinum in the upper flow side, the PM collected in the filter 3Ab in the lower flow side is oxidized by generated nitrogen dioxide into carbon dioxide and the PM is removed.

As compared with the oxidation of the PM by oxide, the oxidation of the PM by nitrogen dioxide is practiced in a low temperature due to low energy barrier. Therefore since the energy supply from exterior can be reduced, by using heat energy in the exhaust gas, the filter regeneration can be achieved by oxidizing to remove the PM while collecting the PM continuously.

Furthermore in FIG. 6, a continuous regeneration type DPF system (an integrated type $NO_2$ regeneration DPF system) 1B which the system 1A illustrated by FIG. 5 is improved is shown. In the system 1B. The oxidation catalyst 32A is coated on a wall surface of a wall flow type filter 3B equipped with the catalyst and on the wall surface, nitrogen monoxide in the exhaust gas is oxidized and the PM is oxidized by nitrogen dioxide. The system can be made simple by this structure. In order to coat the catalyst on the wall surface of the wall flow filter, however, a earlier pressure damage of the early filter tends to be increased.

Moreover in a continuous regeneration type DPF system 1C (DPF system equipped with the PM oxidation catalyst) illustrated by FIG. 7, a rare metal oxidation catalyst 32A such as platinum and a PM oxidation catalyst 32B are coated on the wall surface of the wall flow type filter 3C equipped with the PM oxidation catalyst in order to achieve the oxidation of the PM on the wall surface by the lower temperature.

The PM oxidation catalyst 32B is a catalyst to directly oxidize the PM by an oxide in the exhaust gas and is made of cerium dioxide.

Moreover for the continuous regeneration type DPF system 1C, in a low temperature oxidation area (about 350° C. to 450° C.), the PM is oxidized by nitrogen dioxide in using a reaction of oxidizing nitrogen monoxide of the oxidation catalyst 32A into nitrogen dioxide. Furthermore in a medium temperature oxidation area (about 400° C. to 600° C.), the PM is oxidized in using a reaction of directly oxidizing the PM by activating oxide in the exhaust gas with the PM oxidation catalyst 32B. Then in a higher temperature oxidation area (600° C. or more) than the temperature in which the PM is burned by oxide in the exhaust gas, the PM is oxidized by oxide in the exhaust gas.

In continuous regeneration type DPF system, by using the catalyst and the oxidation of the PM by nitrogen dioxide, the temperature capable of oxidizing the PM is lowered and the PM is oxidized and removed while collecting the PM.

In these continuous regeneration type DPF systems, however, it is also necessary to raise the exhaust gas temperature to be about 350° C. Therefore under an operation condition of the engine such as an idling or a low load, due to lack of the exhaust gas temperature, the temperature of the catalyst lowers and the activation thereof is deteriorated, thus the necessary reaction described hereinbefore is not caused, and the DPF cannot be regenerated by oxidizing the PM.

Therefore if such operating manner is continued, the DPF cannot be regenerated as it is, the DPF clogs up due to the accumulation of the PM, the system results in problems that the exhaust pressure raises and the deterioration of fuel efficiency or the like is caused.

Therefore in the continuous regeneration type DPF system, an accumulation volume of the PM accumulated on the DPF is calculated from the engine operation condition, the control operation of regenerating the DPF is practiced in comparison with the predetermined DPF regeneration condition set from the relation of the PM accumulation volume and the DPF pressure drop, and the accumulated PM is burned to remove.

Under the condition of the engine operation such as the idling condition with a low exhaust gas temperature and the low load, the filter regeneration is so controlled by using an electronic control type fuel injection system such as a common rail that the exhaust temperature is raised by an injection time delay, by a multiple injection and the like, or for an oxidation catalyst in the former step of the DPF, the fuel is supplied by a post injection and by an injection within an exhaust pipe and burned to raise the exhaust gas temperature more than the PM reburning temperature.

In the regeneration control of such DPF, however, at the time of starting the PM reburning in a medium engine speed area where the exhaust gas is comparatively much exhausted, in the early step of burning PM, if the engine speed is rapidly changed to the operating condition of the low flow rate of the exhaust gas such as the idling, the exhaust gas flow rate which brings out the heat caused by oxidation of the PM in the DPF is reduced. Then a heat quantity brought out of the DPF exhaust gas is also reduced.

Therefore an interior of the DPF is heated to a high temperature. The rise of the temperature causes following problems; since the temperature of the DPF exceeds the temperature of melting a honeycomb material, the DPF is melted and damaged. Furthermore a clack is caused in the honeycomb material by a heat distortion due to the high temperature, and the DPF is destroyed. Furthermore due to the high temperature exceeding the durability of the catalyst, the catalyst is unusually deteriorated.

Moreover in case of the regeneration control of the DPF under the operation condition of less exhaust gas volume such as the idle operation, since the heat caused by burning the PM cannot be brought out of the DPF by the exhaust gas and the DPF interior becomes a high temperature, the DPF is damaged from melting and the deterioration of the catalyst is caused.

Thereby if the regeneration of the DPF is not controlled in the case of a continuous idle operation of the engine, the system results in problems that the accumulation of the PM on the DPF is increased to raise the exhaust pressure and the fuel efficiency is deteriorated to cause the engine trouble.

FIG. 8 illustrates a temperature distribution of the DPF interior side in case that the idle operation is started and the exhaust gas flow rate is rapidly reduced during burning the PM for the DPF regeneration. It is known from this figure that the near of the DPF rear end in central portion becomes unusually high temperature.

SUMMARY OF THE INVENTION

The present invention is proposed to overcome disadvantages of conventional arts which are described hereinbefore and the object of the present invention is to provide an exhaust gas purification system and a method for controlling a regeneration thereof capable of keeping an adequate exhaust gas flow rate, of avoiding a rise of the temperature in the DPF due to a reduction of exhaust gas flow rate and of preventing a damage of the DPF from melting and a deterioration of the catalyst during the DPF regeneration control operation in the idle operation of the engine also.

To achieve the above-described object of the invention, the exhaust gas purification system and a method for controlling regeneration thereof are comprised as follows;

an exhaust gas purification system includes a diesel particulate filter (DPF) to purify particulate matters (PM) in an exhaust gas of a diesel engine; further includes a regeneration control device to judge a condition of an engine operation to be an idle operation or not at the time of starting the regeneration control operation for regenerating the diesel particulate filter and during the regeneration control operation, when the engine operation is judged to be an idle operation, an idle engine speed is controlled and raised to the predetermined engine speed.

Furthermore in the exhaust gas purification system, the regeneration control device is set the predetermined engine speed corresponding to the accumulation volume of the particulate matters accumulated in the diesel particulate filter.

Furthermore in the exhaust gas purification system, the diesel particulate filter comprises a wall flow type filter having a large number of exhaust gas passages each comprising a porous peripheral wall and having an inlet opening and an outlet opening each of which is partly sealed or opened in a hound's-tooth check arrangement.

For the wall flow type filter, there is a monolith honeycomb-shaped filter made of ceramics.

Furthermore for the DPF collecting the PM, other than a wall flow type filter, a fiber-shaped type filter having a fiber made of ceramics or metals can be used and there is a case to make these DPF equipped with an oxidation catalyst and the PM oxidation catalyst.

A method for controlling a regeneration of an exhaust gas purification system is comprised as follows;

The method for controlling the regeneration of the exhaust gas purification system is a regeneration control method in the exhaust gas purification system including a diesel particulate filter to purify particulate matters in an exhaust gas of a diesel engine and is comprised that a condition of an engine operation is judged to be an idle operation or not at the time of starting the regeneration control operation for regenerating the diesel particulate filter and during the regeneration control operation, when the engine operation is judged to be an idle operation, an idle engine speed is controlled and raised to the predetermined engine speed.

In the method for controlling a regeneration of an exhaust gas purification system, the predetermined engine speed is set corresponding to the accumulation volume of the particulate matters accumulated in the diesel particulate filter.

According to such structures, in the regeneration control operation of the DPF, if the engine operating condition is shifted to the idle operation that the exhaust gas flow rate is rapidly reduced and for the necessity of the DPF regeneration control operation in the idle operation such as low volume of the exhaust gas flow rate, since the idling condition speed is raised corresponding to the PM accumulate volume, the heat caused by an oxidation of the PM can be exhausted out of the DPF. Therefore a damage of the DPF from melting and the deterioration of the catalyst due to an occurrence of a partial high temperature can be prevented.

Moreover under the condition of low exhaust gas flow rate such as the idle operation, since the regeneration of the DPF can be controlled, the raise of the exhaust pressure due to an increase of the PM accumulation volume, the deterioration of the fuel efficiency caused by the raise of the exhaust pressure and the engine trouble can be prevented. Furthermore corresponding to the volume of accumulated PM on the DPF, the idle engine speed is raised, and the volume of raising the idle engine speed can be minimized to restrict the deterioration of the fuel efficiency.

Therefore the exhaust gas purification system of the present invention can be achieved with low cost and has a high reliability.

BRIEF DESCRIPTION OF THE DRAWINGS

These and others and advantages of the present invention will become clear from following description with reference to the accompanying drawings, wherein.

DETAILED DESCRIPTION OF THE PREFFERED EMBODIMENT

The exhaust gas purification system and a method for controlling a regeneration thereof will be described for an example of the DPF being a wall flow type filter when taken in connection with the accompanying drawings.

Figure 1:
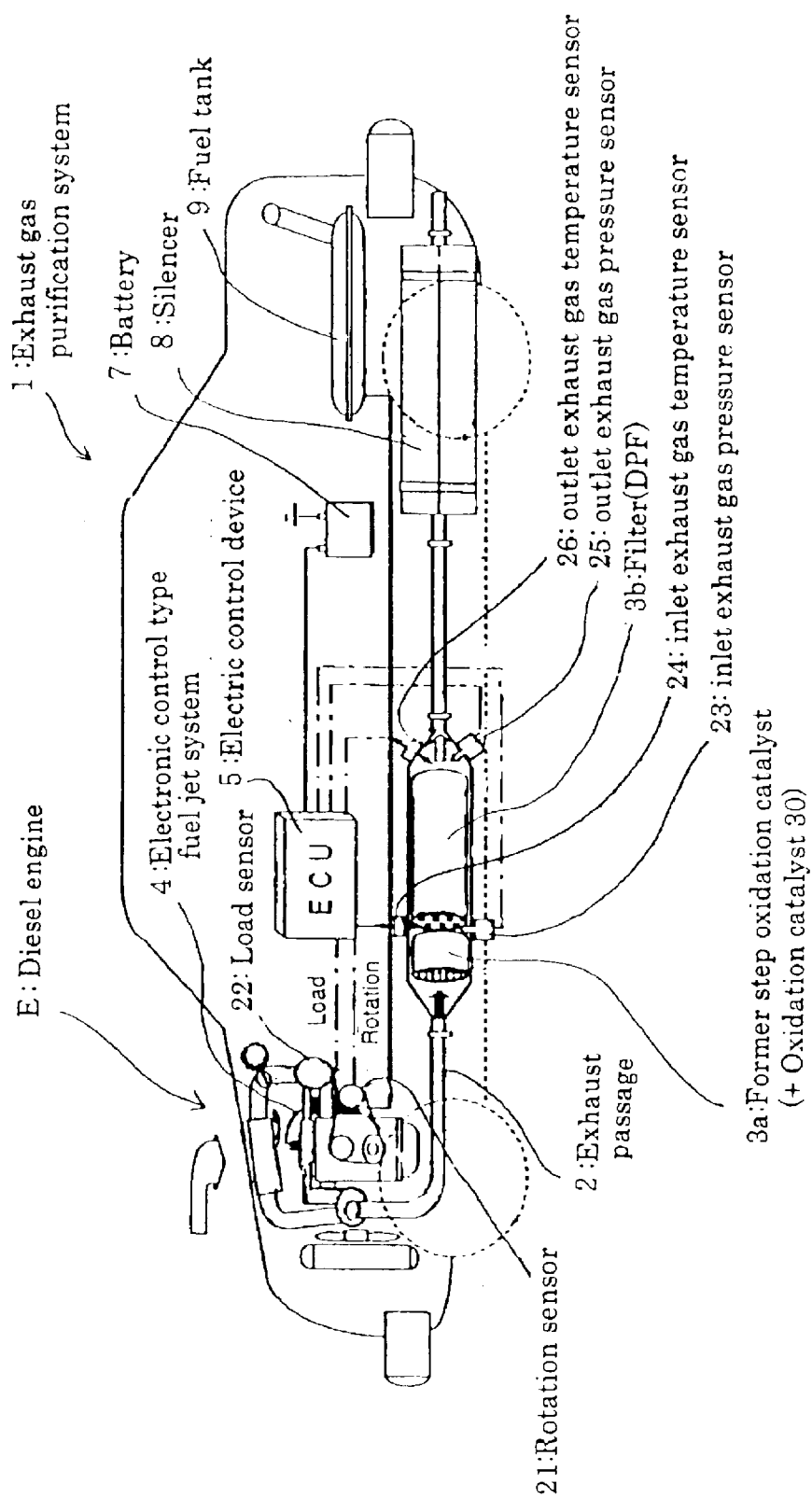
FIG. 1 is a structure view of the exhaust gas purification system in accordance with an embodiment of the present invention.

In the exhaust gas purification system 1 illustrated by FIG. 1, a diesel engine E is formed with an electronic control type fuel jet system 4 such as a common rail, a rotation sensor 21 and a load sensor 22.

Furthermore on an exhaust passage 2, from the upper flow side, a former step oxidation catalyst 3a of the DPF, a DPF inlet exhaust gas pressure sensor 23, a DPF inlet exhaust gas temperature sensor 24, DPF 3b, the DPF outlet exhaust gas pressure sensor 25 and a silencer 8 are provided.

Furthermore an electronic control device (controller: ECU) 5 is disposed for controlling the electronic control type fuel injection system 4, for the other engine control and for the regeneration control of the exhaust gas purification system 1 upon receiving signals from the sensors. This electronic control device 5 is actuated by supplying an electric power from a battery 7.

The former step oxidation catalyst 3a of the DPF includes a plurality of exhaust gas passages (cells) penetrating from upper flow side to the lower flow side, is formed in a honeycomb structure by a cordierite, Sic, stainless, metal and the like and is formed by coating the wall surface of the exhaust gas passage the oxidation catalyst 30 which carries platinum with alumina, zeolite, silica.

The oxidation catalyst 30 is formed by a rare metal such as platinum, and by the catalytic activity of this catalyst 30, the HC generated by for example a post injection is burnt to raise the temperature of exhaust gas located downstream of the catalyst 30 and cause the PM captured by DPF 3b at a succeeding stage to be oxidized.

Figure 3:
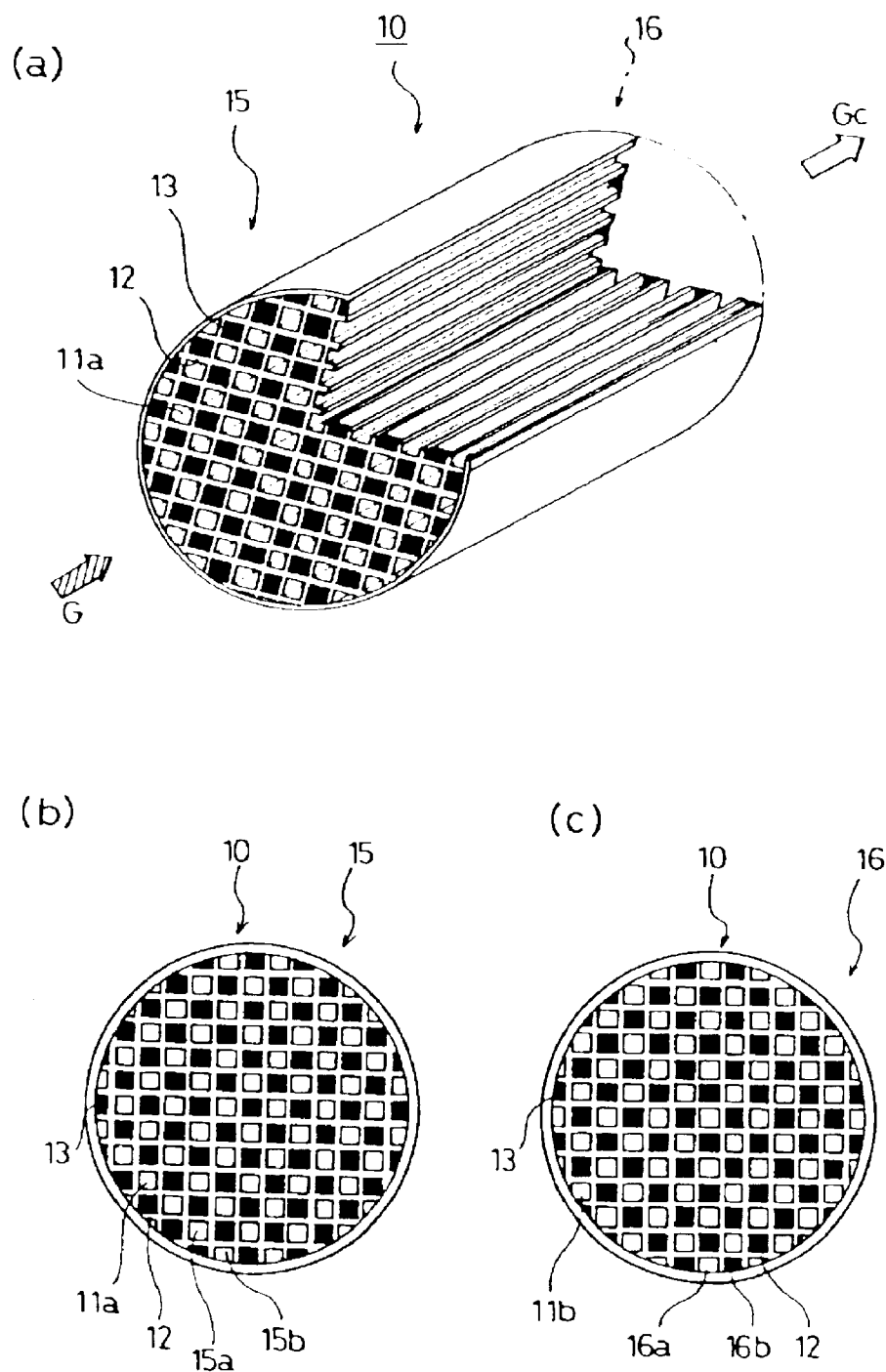
FIG. 3 shows a typical structure of the DPF, (a) is a perspective view and a partially cross-section view, (b) is a front view and (c) is a rear view of the DPF.
Figure 4:
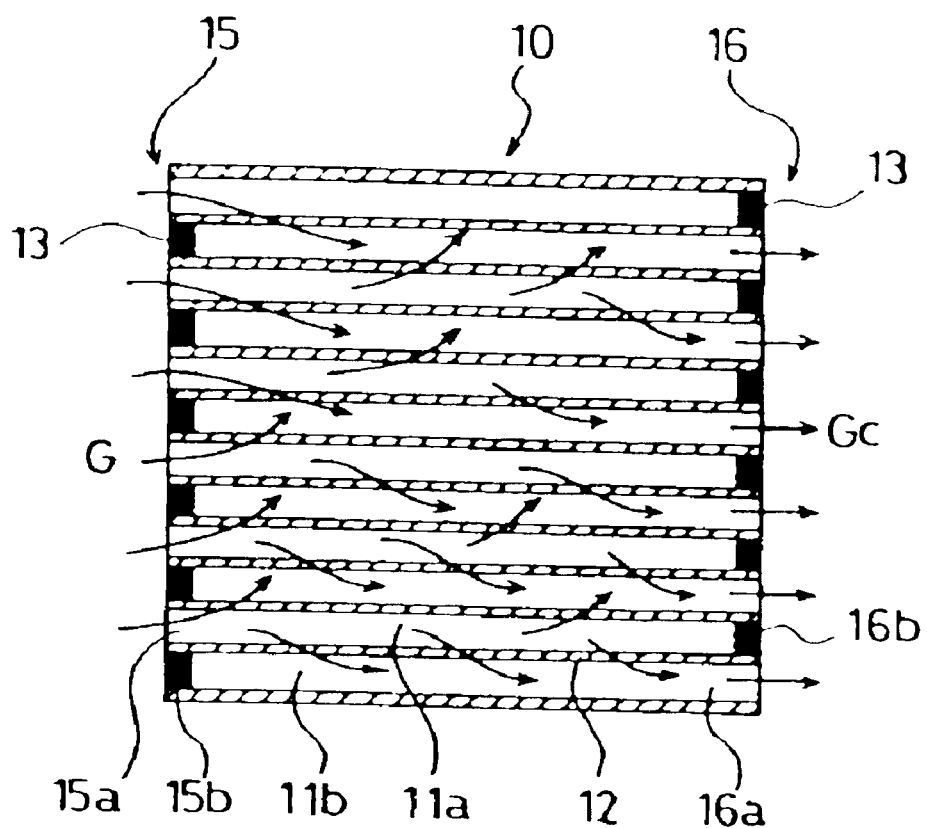
FIG. 4 is a side view of the typical DPF of FIG. 3.
Figure 5:
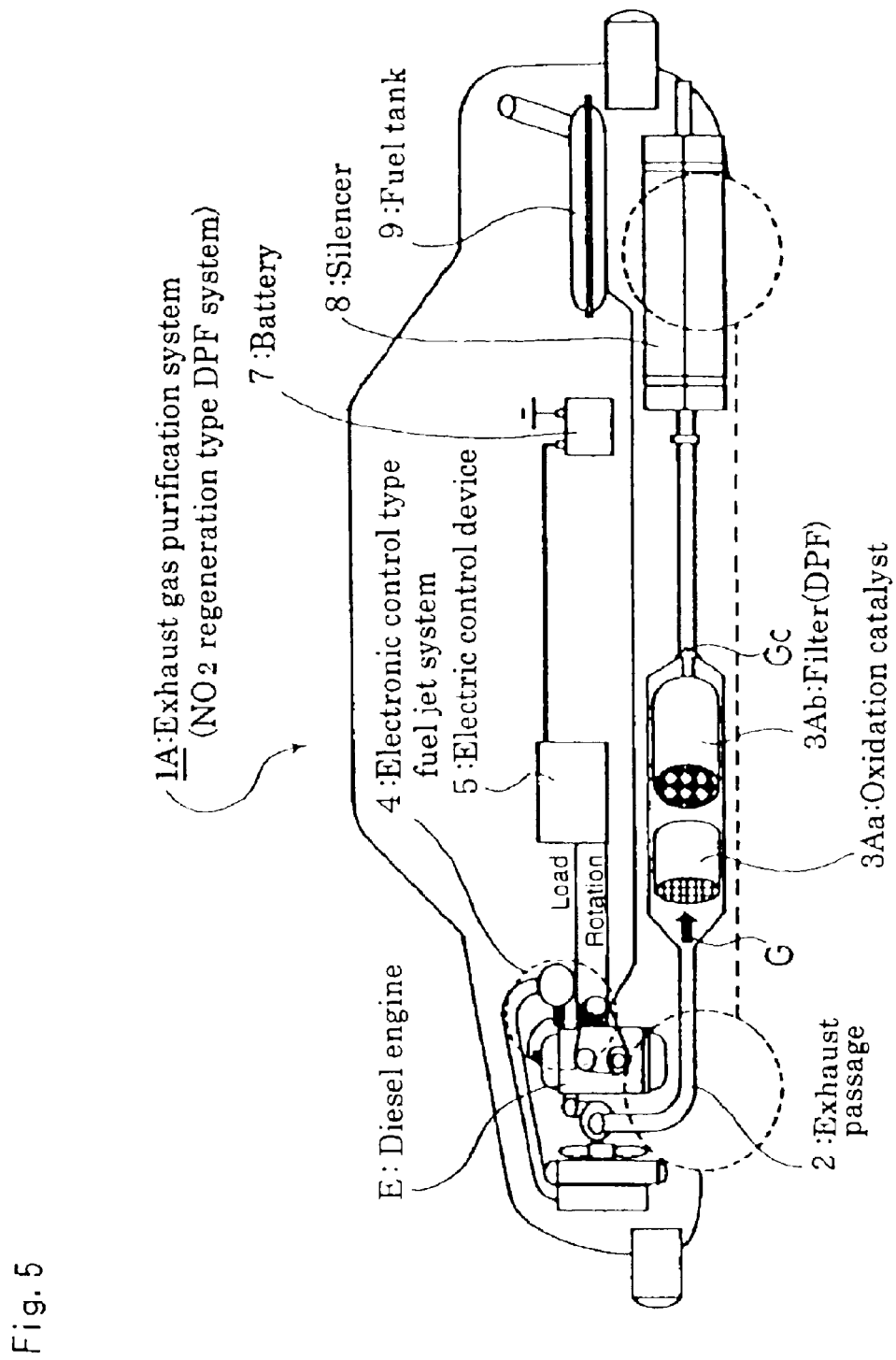
FIG. 5 is a structure view showing an example of a conventional continuous regeneration type DPF system that the oxidation catalyst is equipped.

For the DPF such as DPF 3b, as shown by FIG. 3 and FIG. 4, a wall flow type filter 10 is used. The filter 10 includes a plurality of exhaust gas passages 11a, 11b which a periphery is formed into a porous wall surface 12 and an inlet side 15 and an outlet side 16 of the exhaust gas passages (cells) 11a, 11b are respectively sealed in a staggered way 13.

The PM in the exhaust gas G is collected by a porous wall surface 12 at the time of passing there through. In a case of the exhaust gas temperature 600° C. or more, the collected PM self-burns and purified to carbon dioxide. In case of the temperature about 600° C. or less and about 350° C. or more, the PM is burned and purified by nitrogen dioxide in the exhaust gas and the oxidation effect of the PM catalyst carried in the filter. In case of the exhaust gas temperature about 350° C. or less, the exhaust gas temperature is raised almost 600° C. by the PM reburning control of the engine and the PM is burned and purified.

Next, the regeneration control method in the exhaust gas purification system 1 will be described.

Figure 2:
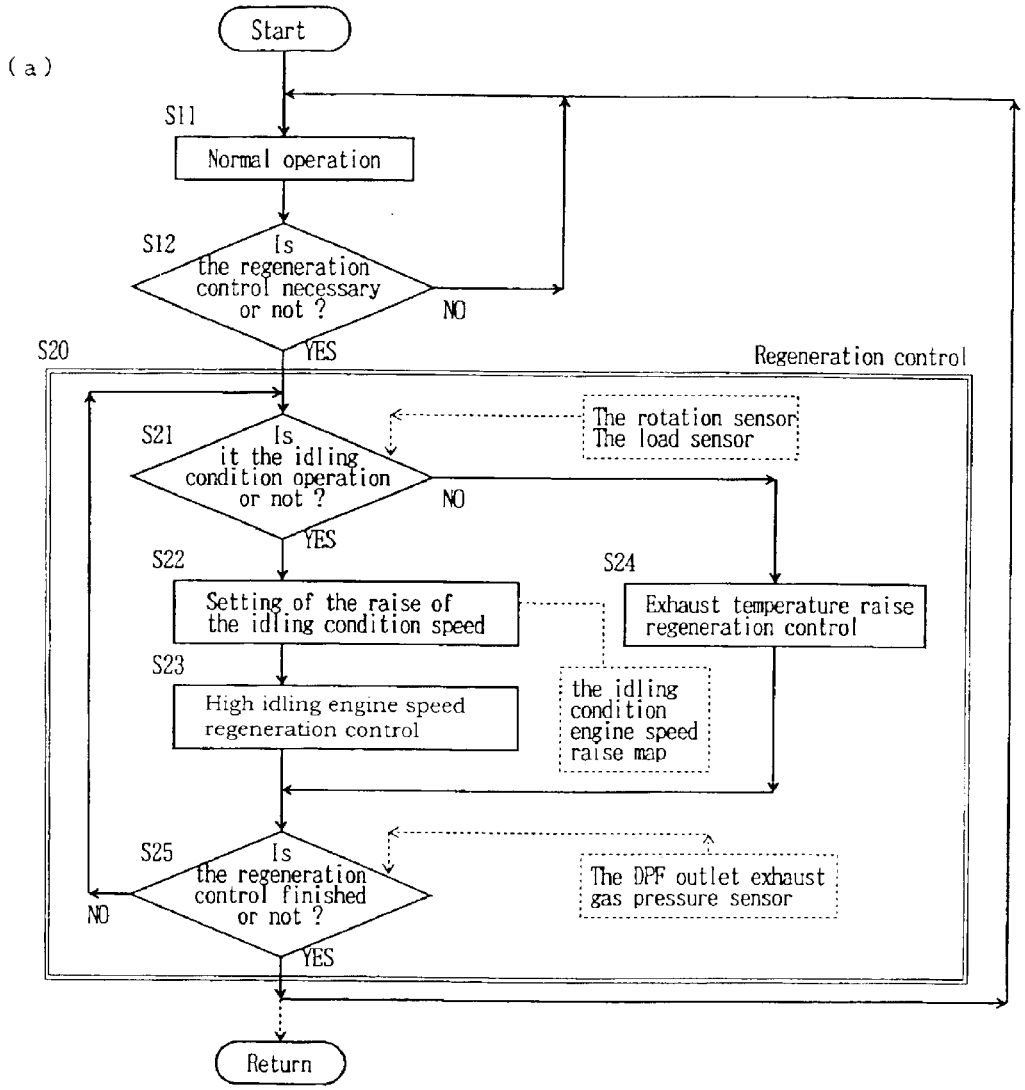
FIG. 2 is a view showing the regeneration control in accordance with an embodiment of the present invention, (a) is a flow chart showing an example of the regeneration control flow, (b) is a view showing an example of an idling condition speed raise map used for setting the raise of the idling condition speed.
Figure 2:
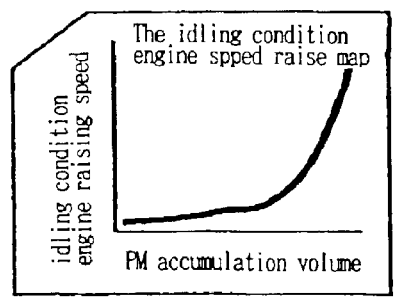

An example of the regeneration control flow chart of the present invention is illustrated by FIG. 2.

In a flow chart of the regeneration control in FIG. 2(a), it is shown that a control flow which is practiced in parallel with a main control flow for controlling the engine and the like. Therefore when the operation of the engine is started, the control starts from the main control flow, together with a stop order of the engine operation such as stopping the engine, due to an interruption, the operation is stopped to return to the main control flow. Furthermore the operation stop partly due to the interruption is not shown by a flow chart of FIG. 2(a).

Then when the regeneration control flow starts, in the step S11, the normal operation is controlled during a determined time ts (time relates to a cycle time of the control) and the control progresses to the step S12 to judge the necessity of the regeneration control of the DPF or not, if not, the control returns to the normal operation control in the step S11.

Furthermore if it is judged in the step S12 that the regeneration control of the DPF is necessary, the control progresses to the step S20 to operate the regeneration control.

In respect of the judge for the necessary or not of the regeneration control of the DPF, the PM accumulation volume is calculated by an estimated total PM volume which is accumulated on the DPF under the engine operation condition, when the calculated PM accumulation volume exceeds the predetermined PM accumulation limit volume, the necessity of the regeneration control is judged.

In another case, after calculating the DPF damage from the pressure (or the different pressure between before and after) corresponding with PM accumulation volume, when the DPF damage from the pressure (or the different pressure between before and after) which is calculated from the pressure calculate value of the DPF outlet exhaust gas pressure sensor 25 (or the DPF inlet exhaust gas pressure sensor 23 and the DPF outlet exhaust gas pressure sensor 25) exceeds the limit value of the predetermined DPF pressure damage (or difference pressure limit value), the necessity of the regeneration control is judged.

Furthermore in the regeneration control in the step S20, at first, in the step S 21, the operation condition of the engine is watched from the engine speed and the load calculated by the engine speed sensor 21 and the load sensor 22 to judge the idling condition operation or not.

In the step S 21, in case of the idle operation being judged, a raise of the idling condition speed is set in the step S 22. The raise of the idling condition engine speed is set in accordance with a data of the idle engine speed raise map which shows the idling condition engine rising speed in respect of the PM accumulation volume, as illustrated by FIG. 2(b). The idling condition engine speed raise map is predetermined by a data from an examination and an experiment and memorized in the control system.

Furthermore at the time of starting the regeneration, the PM accumulation volume is the same value which is used for the judge of the regeneration control, and during the regeneration, the volume is calculated from a relation of the pressure (or different pressure) and the PM accumulation volume, by using a measured pressure of the DPF outlet exhaust gas pressure sensor 25, or by using a different pressure between the measured pressure of the DPF outlet exhaust pressure sensor 25 and the measured pressure of the DPF inlet exhaust pressure sensor 23.

Furthermore the engine speed is set in the step S 22, the high idle engine speed regeneration control is practiced in the step S 23 during the determined time ts and the control progresses to the step S 25.

By raising the idling condition engine speed, the high idling condition engine speed regeneration control in the step S 23 makes the exhaust gas volume to increase than the exhaust gas volume of the normal idle engine speed to bring the heat caused from burning the PM out of the DPF 3b. At this time, since the exhaust gas flow rate is reduced, the exhaust temperature rising control for the injection time delay or for a multiple injections and the like is reduced or is stopped to control the rise of the exhaust gas temperature.

Furthermore if the engine is judged not to be an idle operation in the step S 21, the exhaust temperature rise regeneration control in the step S 24 is operated during the determined time ts and the control progresses to the step S 25.

In the exhaust gas temperature rise regeneration control, by delaying the injection time and by a multiple injections for controlling of the fuel injection of the engine or by supplying the fuel into the oxide former step catalyst 3a of the DPF by a post injection (after injection) or by an injection within an exhaust pipe, the gas temperature is raised by burning the fuel and the exhaust temperature is raised. And the temperature of the DPF is raised more than the temperature capable of oxidizing the PM collected in the DPF.

Normally in the exhaust temperature rise regeneration control, the rising of the exhaust temperature after the DPF passing through is also adjusted and controlled so as not to exceed by watching the temperature and the like of the DPF outlet exhaust gas temperature sensor 26.

Further in the step S 25, the regeneration control is judged whether the regeneration control is finished, if the control is judged to come to an end, it is judged that the DPF is sufficiently regenerated and there is no need of regeneration control, the control returns to the normal operation control in the step S11. If it is judged whether the regeneration control is finished yet, it is judged that the regeneration of the DPF is not sufficient and needs to be controlled, and the regeneration control returns to the step S 21 and is continued.

In accordance with the exhaust gas purification system 1 and the method for controlling the regeneration thereof, the regeneration of the DPF is controlled by judging whether the engine operating condition is an idle operation, or the operation is changed to the idle operation. Then if the operation is judged to be an idle operation, the idle engine speed is raised to the high idle engine speed corresponding to the PM accumulation volume. Under such controls, the regeneration is controlled by adjusting the exhaust gas flow rate and the exhaust temperature.

Therefore during the idle operation, the heat accumulation in the DPF can be prevented from generating by avoiding the extreme reduction of the exhaust gas flow rate. Thereby no partial high temperature portion generates in the DPF and a damage of the DPF from melting and from clacking can be prevented.

Further in the embodiment, the exhaust gas purification system 1 equipped with the former step oxidation catalyst 3a of the DPF and the DPF 3b is applied, however it is not limited to the system and the present invention can be applied to the other exhaust gas purification system also.

Figure 6:
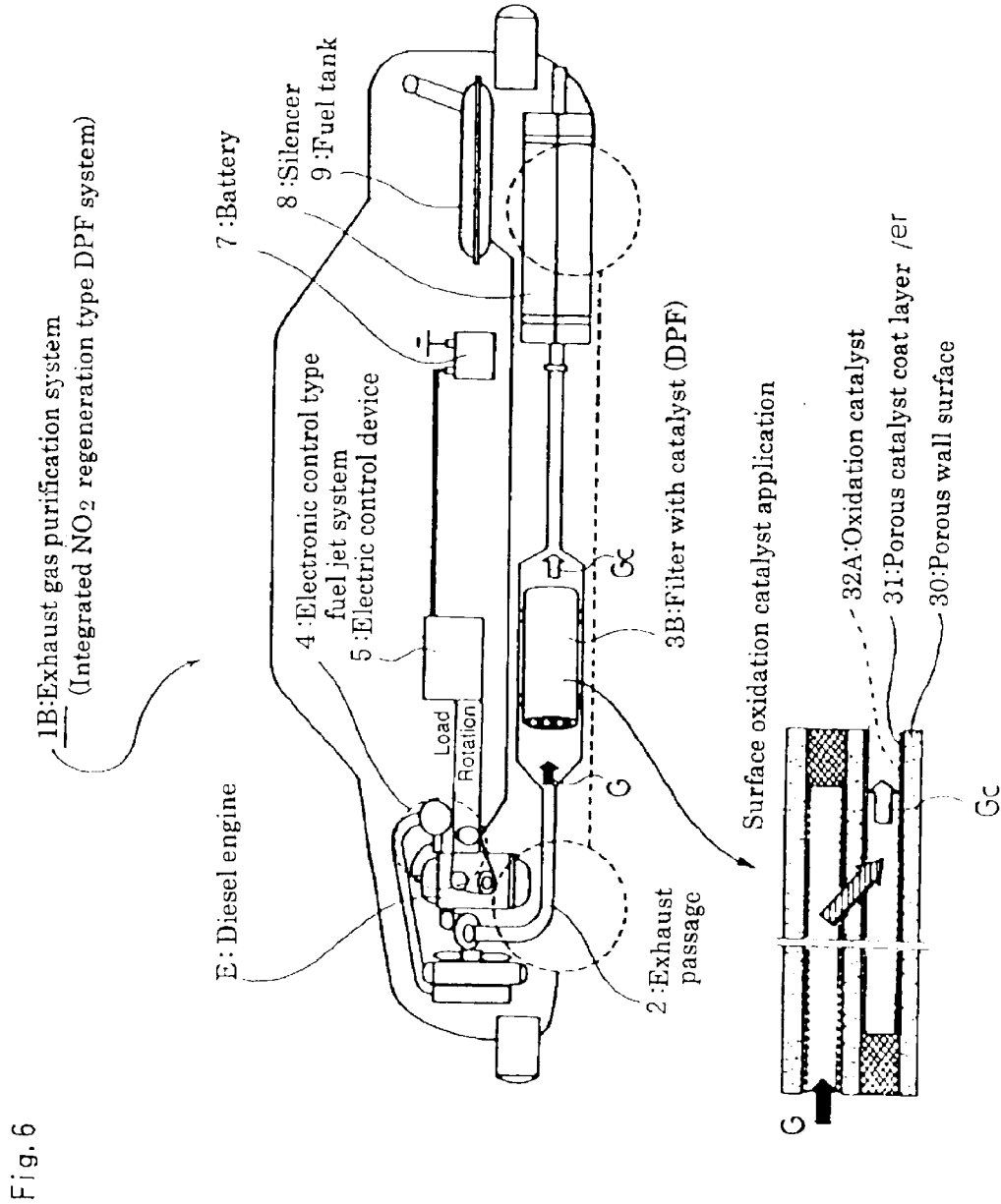
FIG. 6 is a structure view of an example of the conventional continuous regeneration type DPF system having a filter equipped with the oxidation catalyst.
Figure 7:
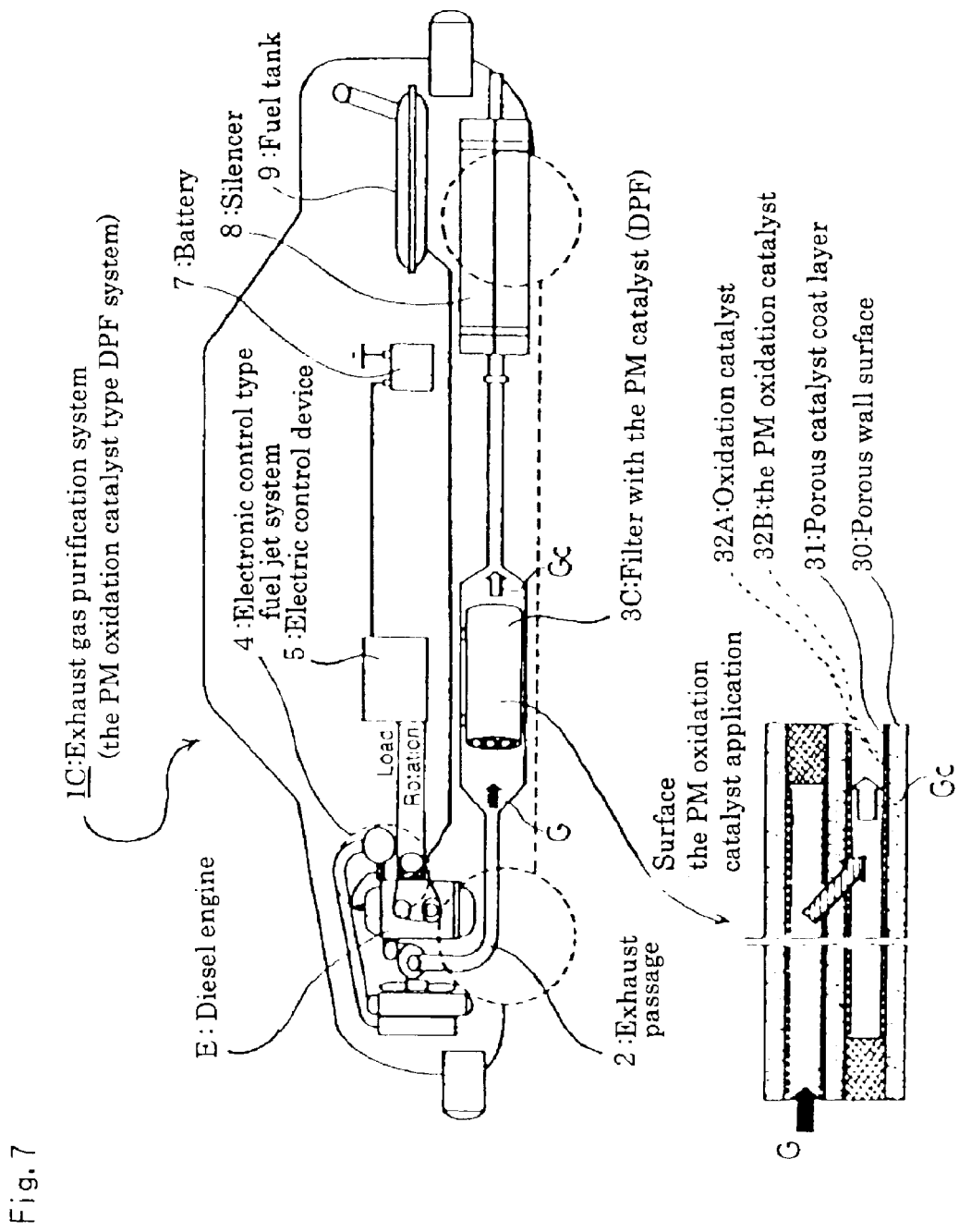
FIG. 7 is a structure view of an example of the conventional continuous regeneration type DPF system including a filter equipped with the PM oxidation catalyst.
Figure 8:
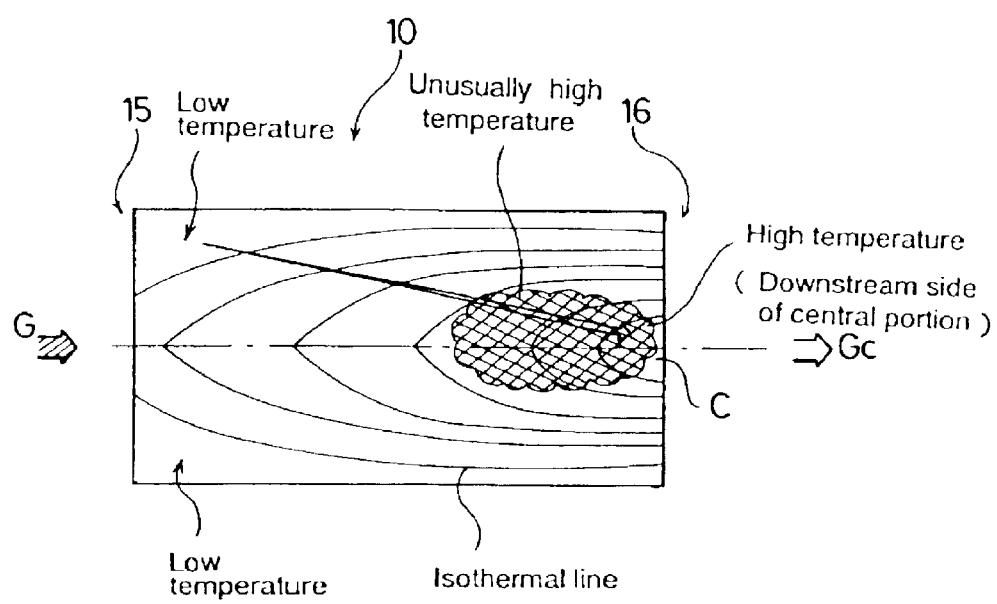
FIG. 8 is an isothermal view of the typical side cross section showing a situation of the temperature distribution in an idling condition operation of the regeneration control operation for the conventional filter.

For example, as shown by FIG. 6 and FIG. 7, for the exhaust gas purification system of a single DPF equipped with no former step oxidize catalyst 3a of the DPF, for the exhaust gas purification system 1B, 1C equipped with no former stem oxidize catalyst 3a of the DPF but with the filter equipped with the catalyst or the filter equipped with the PM oxidation catalyst, the present invention can be also applied.

Furthermore in the exhaust gas purification systems 1B, 1C equipped with the filter with the catalyst or the filter with the PM oxidation catalyst, the filter can be also prevented from melting and from cracking and the catalyst coated on the filter can be also prevented from deteriorating due to the high temperature.

Moreover, for the exhaust temperature rise in the regeneration control operation, in stead of the rising of the exhaust temperature by after injection of the engine fuel, the system of the rise of the exhaust temperature may be practiced by the fuel injection within an outlet passage 2 from the injection valve which is provided on exhaust passage 2 on the upper stream of the former step oxidization catalyst 3a of the DPF.

What is claimed is:

1. An exhaust gas purification system comprising:
   a diesel particulate filter to purify particulate matters in an exhaust gas of a diesel engine;
   a regeneration control device to judge whether an operation condition of an engine is an idle operation or not at the time of starting a regeneration control operation to regenerate said diesel particulate filter and during the regeneration control operation, and to control an idle engine speed to raise to a predetermined engine speed when said engine operation is judged to be an the idle operation, said regeneration control device being set to the predetermined engine speed corresponding to an accumulation volume of the particulate matters accumulated in said diesel particulate filter.

2. An exhaust gas purification system according to claim 1, wherein said diesel particulate filter comprises a wall flow type filter having a large number of exhaust gas passages, each comprising a porous peripheral wall and having an inlet opening and an outlet opening each of which is partly sealed or opened in a hound's-tooth check arrangement.

3. A method for controlling a regeneration of an exhaust purification system including a diesel particulate filter to purify particulate matters in an exhaust gas of a diesel engine, comprising:
   judging whether an operation condition of an engine is an idle operation or not at the time of starting a regeneration control operation to regenerate the diesel particulate filter and during the regeneration control operation, and controlling an idle engine speed to raise to a predetermined engine speed when the engine operation is judged to be an idle operation, the predetermined engine speed being set corresponding to the accumulation volume of the particulate matters accumulated in the diesel particulate filter.

4. A method for controlling regeneration of an exhaust purification system, including a particulate filter, comprising:
   determining whether an engine is in an idle operation; and
   increasing an idle engine speed to a predetermined engine speed when the engine is in an idle operation, the predetermined engine speed corresponding to a volume of particulate matter accumulated in the particulate filter.

* * * * *

UNITED STATES PATENT AND TRADEMARK OFFICE
CERTIFICATE OF CORRECTION

PATENT NO.    : 6,802,180 B2
DATED         : October 12, 2004
INVENTOR(S)   : Masashi Gabe et al.

It is certified that error appears in the above-identified patent and that said Letters Patent is hereby corrected as shown below:

Column 8,
Line 32, please delete the "an".

Signed and Sealed this

First Day of March, 2005

JON W. DUDAS
*Director of the United States Patent and Trademark Office*